United States Patent [19]

Roller

[11] Patent Number: 5,194,351
[45] Date of Patent: Mar. 16, 1993

[54] SINGLE PASS DIGITAL XEROGRAPHIC PROCESS COLOR REPRODUCTION

[75] Inventor: George J. Roller, Penfield, N.Y.
[73] Assignee: Xerox Corporation, Stamford, Conn.
[21] Appl. No.: 632,298
[22] Filed: Dec. 21, 1990
[51] Int. Cl.$^5$ ............................................. G03G 13/01
[52] U.S. Cl. ....................................... 430/45; 430/44; 430/120; 355/326
[58] Field of Search ...................... 430/35, 45, 44, 120; 346/157; 358/298; 355/245, 326

[56] References Cited
U.S. PATENT DOCUMENTS
4,903,048 2/1990 Harrington .......................... 346/157

Primary Examiner—Marion E. McCamish
Assistant Examiner—S. Rosasco

[57] ABSTRACT

Xerographic method and apparatus capable of achieving a very large gamut of colors using the tri-level, highlight color process. Tri-level images are formed within pixel distance of a prior developed image. These images are developed with one of two different color toners followed by recharging of the charge retentive surface and a second exposure to form more tri-level images which are selectively developed using two different color toners which are also different in color from the other toners.

2 Claims, 2 Drawing Sheets

SINGLE PASS DIGITAL XEROGRAPHIC PROCESS COLOR REPRODUCTION

BACKGROUND OF THE INVENTION

This invention relates generally to color imaging and more particularly to a method and apparatus for producing a large gamut of colors using tri-level, highlight color imaging.

In the practice of conventional xerography, it is the general procedure to form electrostatic latent images on a xerographic surface by first uniformly charging a charge retentive surface such as a photoreceptor. Only the imaging area of the photoreceptor is uniformly charged. The image area does not extend across the entire width of the photoreceptor. Accordingly, the edges of the photoreceptor are not charged. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

In tri-level, highlight color imaging, unlike conventional xerography, the image area contains three voltage levels which correspond to two image areas and to a background voltage area. One of the image areas corresponds to non-discharged (i.e. charged) areas of the photoreceptor while the other image areas correspond to discharged areas of the photoreceptor.

The concept of tri-level, highlight color xerography is described in U.S. Pat. No. 4,078,929 issued in the name of Gundlach. The patent to Gundlach teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the change pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

In highlight color xerography as taught by Gundlach, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged-area development, i.e. CAD) stays at the full photoreceptor potential ($V_{cad}$ or $V_{ddp}$, shown in FIG. 1a). The other image is exposed to discharge the photoreceptor to its residual potential, i.e. $V_{dad}$ or $V_c$ (typically 100 v) which corresponds to discharged area images that are subsequently developed by discharged-area development (DAD) and the background areas exposed such as to reduce the photoreceptor potential to halfway between the $V_{cad}$ and $V_{dad}$ potentials, (typically 500 v) and is referred to as $V_{white}$ or $V_w$. The CAD developer is typically biased about 100 v ($V_{bb}$, shown in FIG. 1b) closer to $V_{cad}$ than $V_{white}$ (about 600 v), and the DAD developer system is biased about 100 v ($V_{cb}$, shown in FIG. 1b) closer to $V_{dad}$ than $V_{white}$ (about 400 v).

Currently, a process known as the four-color separation process is very widely used in the printed reproduction of colored pictures, transparencies and the like. The four-color separation process is generally responsible for all of the high-quality colored reproductions in magazines and books, and is also used for some newspaper work as well.

In the most common version of this process, the original print or transparency is photographed through different filters to produce different individual films which correspond to the basic colors of the four-color separation process: yellow, magenta, cyan and black. The filters utilized to extract the first three of these colors from the original have tints which are the complementary colors of the colors being drawn out. Thus, a green filter is used to pick out the magenta, a blue filter is used to pick out the yellow, and a red filter is used to pick out the cyan. A combination of all filters is ideally utilized to pick out the black, although in some processes the black film is made by photographing the original in black-and-white film, without any filter.

Some "fine tuning" or adjustment of the intensities of the various colors in the process is made by selecting exposure times and development times. Also, in some instances the final inks used to print the final reproduction can be varied and selected to attain certain effects.

From the four pieces of film produced through this process, printing plates are made, these being subsequently attached to plate cylinders in a typical printing machine, which is then able to print the reproduction using the process colors; yellow, magenta, cyan and black.

Generally speaking, the printing industry is of the view that proper reproduction of any photograph or the like requires a four-color separation process of the kind just described, utilizing the process ink colors.

However, in certain branches of the printing industry, particularly in newspapers, shopping bags, the Yellow Pages and advertising flyers, the full four-color separation process represents a considerable expense, since it requires the material to be passed through four printing stations, in order to receive the four colors. This in turn requires the production of four plates, and the time required to mount them, adjust the components, etc. All of this represents a substantial cost factor which, for obvious reasons, it would be of advantage to reduce.

There is two-ink process forming part of the prior art, known as duotone. In one version of this process, often called "Fake" duotone, a black and white original (for example a photograph) is first photographed on "Ortho" film through a contact screen to give a screen film. "Ortho" film is a high contrast film which is not sensitive to the red region of the spectrum. Then, the same screen is rotated through an angle of 30 degrees and another screen film is taken, substantially identical to the first, also on "Ortho" film. The two films are developed to different densities, then are used to make plates which are run in two colors, for example, red and black.

In another version of duotone, often called "Real" duotone, the original art is already in two colors, for example, red and black. The first step is to shoot "Ortho" film through a gray contact screen without any filter. Both the red and the black will be seen by the film, and the result will be a film in which the red and black are both picked up as black. Then, a panchromatic film is exposed through a red filter and a grey contact screen. In this arrangement, the film sees only black. The two films are then used to make plates which print red and black, respectively.

It is also known, particularly in the food advertising area where blue colors are rare, to do a three-color separation using the standard filters to obtain yellow, magenta and cyan, and then to print the image using yellow ink, red ink and black ink. In other words, the plate made from the cyan film prints in black ink.

It is further known to mix various colors to produce various other colors. For example, it is known to print a dot matrix of black superimposed on a dot matrix of yellow in order to produce various shades of green. It is also known that red and yellow will combine in the same way to produce orange. It is further known that yellow and cyan will combine to produce various shades of green.

Disclosed in U.S. Pat. No. 4,554,241 granted to Wallace Edwards on Nov. 19, 1985 is a process for creating strikingly realistic reproductions of an original utilizing only two printing plates inked with only two different colors. However, the process of making these plates does not involve simply one of the known parts of the standard four-color separation, nor does it utilize process inks.

By way of explaining this, it should be understood that, if a four-color separation were made to produce four plates intended to print yellow, magenta, cyan and black, and then if only the yellow and red were printed, or only the yellow, blue and black, or any other combination which was not the full combination of four colors, the resulting print would be clearly and definitely unbalanced, and anyone viewing the print would immediately see the unbalanced nature of the colors. The print would appear "too reddish" or "too far into the blue region", or blotchy. The aim of the process described in the '241 patent is to remove the unbalanced nature of a printed reproduction made with only two impressions, and thus two inks.

Simply stated, the process disclosed in the '241 patent consists in making a red printer by utilizing sequentially a green filter and a blue filter, and making a printer for another color such as green, blue or black by utilizing sequentially a red filter and a blue filter. More particularly, device described therein provides a method of printing on a sheet member a realistic reproduction of a colored original, utilizing a minimum of two different superimposed impressions, each with a different coloring medium, comprising:

(a) providing a colored original,
(b) creating a first printing plate intended to print a non-process red color, by
(1) making a green filter exposure of the original on a first means for recording a first optical image,
(2) making a blue filter exposure of the original on said first means, steps (1) and (2) being carried out sequentially in any order,
(c) creating a second printing plate intended to print a second color different from that printed by said first plate, by
(3) making a red filter exposure of the original on a second means for recording a second optical image,
(4) making a blue filter exposure of the original on said second means, steps (3) and (4) being carried out sequentially in any order, and steps (b) and (c) being carried out in any order,
(d) providing a sheet member to receive two superimposed impressions, and
(e) using said first and second printing plates to print said red color and said different color, respectively, as the said superimposed impressions on said sheet member.

The invention of the '241 patent as stated therein, is applicable to the copying industry where it is well understood that the copying process involves the establishment of a latent electrostatic image on a drum or plate constituting a photoconductive surface, following which a colored "toner" is applied to the image-containing portions of the photoconductive surface, the electrical attraction causing the toner to remain in certain areas and be removed from others, following which the photoconductive surface with the toner is applied against a sheet of paper which picks up the toner as an image. The essence of the '241 invention can be applied to the copying industry, by arranging to have the photoconductive surface exposed through not one but two filters for each of the printings. These filters ideally would be used sequentially to build up an electrostatic image which is a composite of the images which would normally be obtained through the two different colored filters. Then this composite electrostatic image is contacted by the appropriate colored toner, and the same is printed on the paper sheet.

In electronic printing on a raster device, the imagable area of the substrate is subdivided into a fine pattern of dots called pixels. The pixel is the smallest area over which one can control the placement of the colorant. The marking device can color or not color each pixel. A computer is used to instruct the marking device as to which pixels to color in order to create the desired image. The pixels are scanned in a fixed order or raster. For each pixel the computer generates a binary value indicating color or no color. An electronic subsystem converts the binary values into the control signals for the marking device. On a black-and-white printer, intermediate shades of gray may be produced by printing a rapidly alternating pattern of black and white pixels. This pattern, when viewed from a distance, has the appearance of gray. Different patterns yield different shades of gray depending on the ratio of black to white pixels. The computer may store a set of patterns which can be used for producing gray shades. The patterns are often saved as a collection of binary values indicating the black/white coloring for a small rectangular area of the image surface. The pattern is then replicated as needed to cover the entire image surface. One might alternatively store in the computer an algorithm for generating the pattern, rather than the pattern itself. In this case the pattern must be synthesized whenever needed. Each pattern is referred to as an "ink" since it results in a different shade of gray. (This is not an actual colorant of toner, but only a pattern within the computer.)

For multi-color printers, the computer must provide a raster of pixel values for each of the colorants. Various shades, hues, and tints are produced by combinations of pixel patterns for the various colorants. The design of the patterns depends fundamentally on whether the marking technology preserves registration between colors. If the raster of pixels for one colorant can move relative to the raster of pixels for another colorant, from one image to the next, then sometimes the pixels for different colors will overlap and sometimes they will not. To avoid moire effects and color shifts, the patterns are designed to distribute and smooth the overlap. This is usually done by a rotation of the relative axes of the patterns for the colorants.

In technologies where the registration between colors is precise, a different approach may be taken. In this case each pixel may be assigned a color. Tri-level electrophotography is just such a technology; in a single pass of the laser beam each pixel is set to either black, highlight color, or substrate color. For a device where registration is maintained one can create patterns (or "inks") in which each pixel is assigned one of the possible primary colors. This results in many more potential patterns than could be formed from strictly binary pixel values. For this approach one needs a scheme for generating the patterns, and if they are to actually be stored, one would like a representation which does not require the large amounts of memory which would be needed for explicit description of every pattern. The invention provides this for the case of two colorants.

U.S. Pat. No. 4,903,048 granted to Steven J. Harrington on Feb. 20, 1990 relates to simulated color imaging using gray level patterns produced from two differently colored materials by employing fine patterns of dots. The dots blend with the background and yield a gray or colored appearance when seen from a distance. The imaging process utilizes ink pattern designs in conjunction with registered two-color imaging to thereby form simulated color images. Digital information representing two sets of gray-level producing patterns, set A for color A and set B for color B, is electronically stored in computer memory. The patterns in set B are complementary to those of set A. An apparent or simulated color image is produced by overlaying, combining or juxtapositioning an pattern from set A with a complementary pattern from set B, the combined image being subsequently rendered visible using two different colorants. A gray level pattern is produced for each elemental area of an original image.

BRIEF SUMMARY OF THE INVENTION

Briefly, the present invention utilizes tri-level, highlight color imaging to provide a color imaging device and method capable of creating a very large color gamut, closely approaching if not attaining full process color. In tri-level, highlight color imaging systems such as disclosed in the '048 patent, each pixel has three possible states: color A, color B or the color of the image substrate which is usually white paper but can be any preferred color. Since all pixels have only one color, apparent shades, hues, etc. are made by juxtapositioning of single colored pixels. Thus, apparent or simulated color is effected by mixing all three states within halftone cells which contain a number of pixels.

In order to extend the color gamut beyond that taught by the '048 disclosure, an imaging process is provided in accordance with the present invention wherein a plurality of tri-level images are formed on a uniformly charged surface by selectively discharging areas of the charge retentive surface containing the uniform charge. These tri-level images are formed by selectively discharging the uniformly charged surface and they are moved past a pair of developer structures at a first development station where the pixels forming each halftone cell may be developed with toner. As noted above, each pixel may have one or the other of the two colors provided by these developer structures deposited thereon. Alternatively, selected pixels may not be developed.

Subsequently, the imaging surface is recharged and then selectively exposed at a second imaging station. This second exposure may form tri-level images in pixel locations complementary to those developed at the first development station as well as at any non-imaged (i.e. developed image) area. As the newly formed tri-level images pass through a second development station, they may be developed with one or the other of the two toner colors at that station which are different colors from those at the first development station.

DETAILED DESCRIPTION OF THE PREFERRED EMBODIMENT OF THE INVENTION

Figure 1:
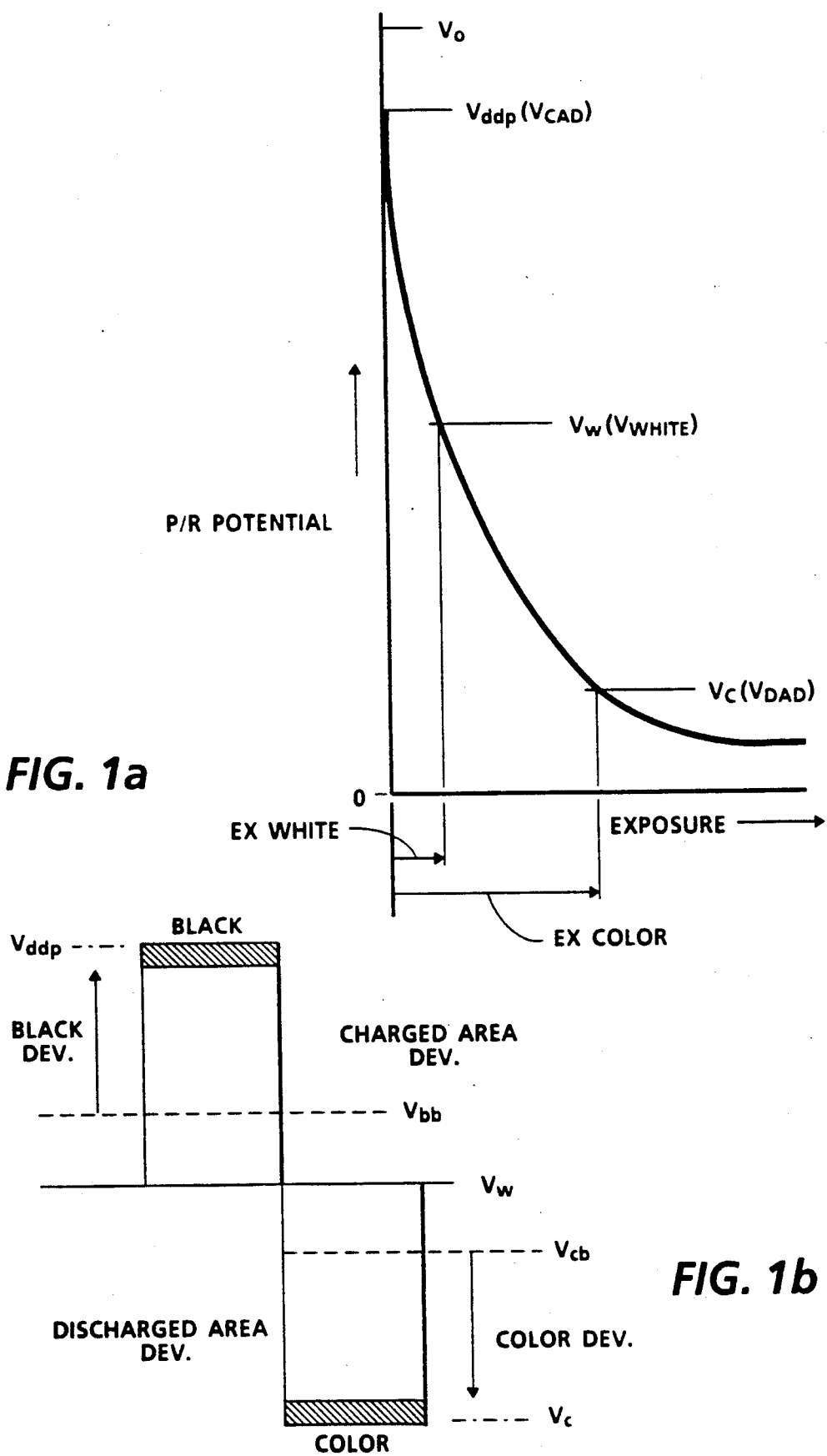
FIG. 1a is a plot of photoreceptor potential versus exposure illustrating a tri-level electrostatic latent image.
FIG. 1b is a plot of photoreceptor potential illustrating single-pass, highlight color latent image characteristics.
Figure 2:
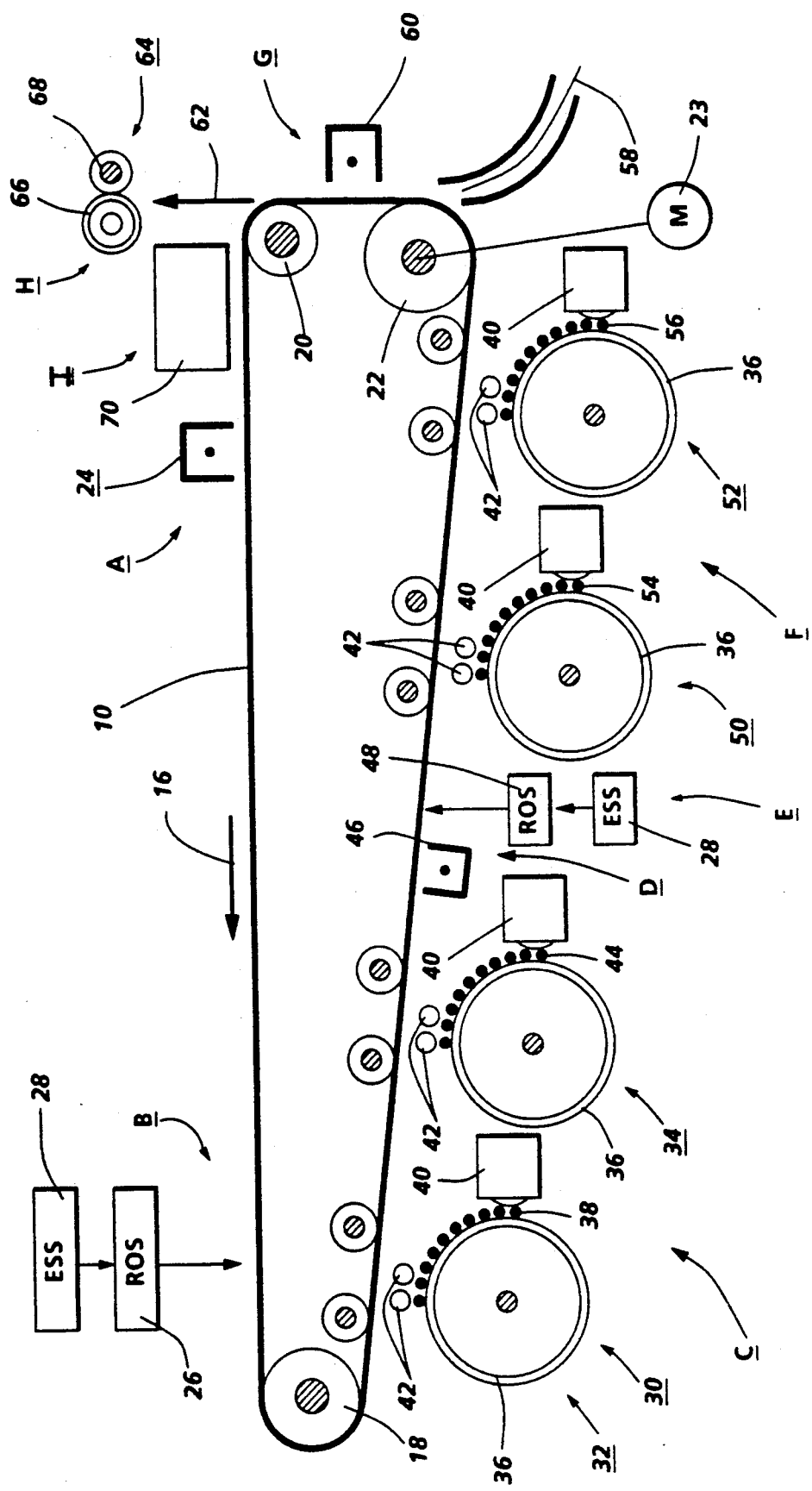
FIG. 2 is a schematic illustration of an imaging apparatus incorporating the inventive features of the invention.

As shown in FIG. 2, a printing machine incorporating the invention may utilize a charge retentive member in the form of a photoconductive belt 10 consisting of a photoconductive surface and an electrically conductive substrate and mounted for movement past a charging station A, first imaging station B, first development station C, recharging station D, second imaging or exposure station E, second development station F, transfer station G, fusing station H and cleaning station I. Belt 10 moves in the direction of arrow 16 to advance successive portions thereof sequentially through the various processing stations disposed about the path of movement thereof. Belt 10 is entrained about a plurality of rollers 18, 20 and 22, the latter of which can be used as a drive roller and the former of which can be used to provide suitable tensioning of the photoreceptor belt 10. Motor 23 rotates roller 22 to advance belt 10 in the direction of the arrow 16. Roller 22 is coupled to motor 23 by suitable means such as a belt drive, not shown.

As can be seen by further reference to FIG. 2, successive portions of belt 10 pass through charging station A. At charging station A, a corona discharge device such as a scorotron, corotron or dicorotron indicated generally by the reference numeral 24 charges the belt 10 to a selectively high uniform positive or negative potential, $V_0$. Any suitable control, well known in the art, may be employed for controlling the corona charging device 24.

Next, the uniformly charged portions of the photoreceptor surface are advanced through first exposure station B. At exposure station B, the uniformly charged photoreceptor or charge retentive surface 10 can be exposed to light from either an illuminated document imaged through a lens or from a digitally modulated light source such as a scanning laser or light emitting diode array. The imagewise light exposure causes the uniformly charged surface to be modified in accordance with the desired electrostatic image. For illustrative purposes, a three level (i.e. full on, full off or half power) laser Raster Output Scanner (ROS) 26 is disclosed. Information processed by an Electronic Subsystem (ESS) 28 generates digital information signals for operating the ROS as well as for controlling operation of the other components of the system.

At first development station C, a development apparatus, indicated generally by the reference numeral 30, advances developer materials into development zones. The development apparatus 30 comprises two scavengeless development systems 32 and 34. The first of these, development system 32, need not be scavengeless but may be any suitable development system, for example, magnetic brush development. The development system 34 must be scavengeless. By scavengeless is meant that the developer or toner of system 34 must not interact with an image already formed on the image receiver. Thus, the systems 32 and 34 also known as non-interactive development systems. The development system 32 comprises a donor structure in the form of a roller 36. The donor structure 36 conveys a toner layer to the development zone (i.e. area between the member 10 and the donor structure 36. The toner layer can be formed on the donor 36 by either a two component developer (i.e. toner and carrier) or a single component developer of toner 38 deposited on member 36 via a combination single component toner metering and charging device 40. The development zone contains an AC biased electrode structure 42 self-spaced from the donor roll 36 by the toner layer 38. The single component toner as illustrated in FIG. 2 may comprise positively or negatively charged blue toner. The donor roller 36 may be coated with TEFLON-S (trademark of E. I. DuPont De Nemours) loaded with carbon black.

For single component toner, the combination metering and charging device 40 may comprise any suitable device for depositing a monolayer of well charged toner onto the donor structure 40. For example, it may comprise an apparatus such as described in U.S. Pat. No. 4,459,009 wherein the contact between weakly charged toner particles and a triboelectrically active coating contained on a charging roller results in well charged toner. Other combination metering and charging devices may be employed. For donor roll loading with two component developer, a conventional magnetic brush can be used for depositing the toner layer onto the donor structure.

The electrode structure 42 is comprised of one or more thin (i.e. 50 to 100μ diameter) tungsten or stainless steel wires which are lightly positioned against the toner 38 on the donor structure 36. The distance between the wires and the donor is self-spaced by the thickness of the toner layer which is approximately 25μ. The extremities of the wires are supported by end blocks (not shown) at points slightly below a tangent to the donor roll surface. Mounting the wires in such manner makes the self-spacing insensitive to roll runout. A suitable scavengeless development system for incorporation in the present invention is disclosed in U.S. Pat. No. 4,868,600 granted to Hays et al on Sep. 19, 1989 and incorporated herein by reference. As disclosed in the '600 patent a scavengeless development system may be conditioned to selectively develop one or the other of the two image areas (i.e. discharged and charged image areas) of the tri-level images by the application of appropriate AC and DC voltage biases to the wires 42 and the donor roll structure 36.

The development system 34 is similar to the developer system 32, like elements thereof being referenced by the same reference characters. FIG. 2 shows the donor structure 36 conveying single component toner 44 deposited thereon via a combination metering and charging devices 40 to an electrode structure 42. The single component toner 44 in this case is charged oppositely to that of the toner 38. For example, if the toner 38 is negatively charged then the toner 44 is positively charged. The toner 38 may comprise green colored toner while the toner 44 may comprise blue colored toner. The donor structure can be rotated in either the 'with' or 'against' direction vis-a-vis the direction of motion of the charge retentive surface. The toners 40 and 42 may also comprise part of a two component development system comprising toner and carrier as basic components.

At the exposure station C, halftone cells comprising one or more tri-level images or pixels are formed. Each pixel has three possible states: the color (i.e. green) of toner 38, the color (i.e. blue) of toner 44 or the color of the image substrate which is usually white paper but can be any preferred color. Since all pixels have only one color, apparent shades, hues, etc. are made by juxtapositioning of single colored pixels. At the development station C, the pixels are developed with either blue or green toner or left undeveloped.

As can be seen by further reference to FIG. 2, successive portions of belt 10 on which images have already been formed pass through recharging station D subsequent to image development at the first development station C. At recharging station D, a corona discharge device such as a scorotron, corotron or dicorotron indicated generally by the reference numeral 46 charges the belt 10 to a selectively high uniform positive or negative potential. Any suitable control, well known in the art, may be employed for controlling the corona charging device 46.

The belt 10 is then moved through a second imaging or exposure station E where latent tri-level images are formed using a ROS 48 which is controlled by the ESS 26.

At development station F, the images formed using the ROS 48 are developed using scavengeless development systems 50 and 52 similar to that of development systems 30 and 34. The development system 50 comprises a donor roll structure 36 for conveying single component toner 54 deposited thereon via a combination metering and charging devices 40 to an electrode structure 42. The single component toner 54 may comprise positively or negatively charged red toner while toner 56 utilized by the developer system 52 comprises black toner which is charged to a polarity opposite to that of toner 54. Thus, another halftone cell comprising juxtaposed colored pixels is formed. Each halftone cell may be formed using any one of the four different color toners thereby providing a much larger color gamut than a conventional tri-level imaging system wherein only two color toners are employed.

Referring again to FIG. 2, a sheet of support material 58 is moved into contact with the toner image at transfer station G. The sheet of support material is advanced to transfer station G by conventional sheet feeding apparatus, not shown. Preferably, the sheet feeding apparatus includes a feed roll contacting the uppermost sheet of a stack copy sheets. The feed roll rotates so as to advance the uppermost sheet from stack into a chute which directs the advancing sheet of support material into contact with photoconductive surface of belt 10 in a timed sequence so that the composite toner powder image developed thereon contacts the advancing sheet of support material at transfer station G.

Transfer station G includes a corona generating device 60 which sprays ions of a suitable polarity onto the backside of sheet 10. This attracts the charged toner powder images from the belt 10 to sheet 58. After transfer, the sheet continues to move, in the direction of arrow 62, onto a conveyor (not shown) which advances the sheet to fusing station H.

Fusing station H includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder images contacting fuser roller 66. In this manner, the toner powder images are permanently affixed to sheet 58. After fusing, a chute, not shown, guides the advancing sheet 58 to a catch tray, also not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station I. A magnetic brush cleaner housing 70 is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining prior to the charging thereof for the successive imaging cycle.

While the embodiment of the invention disclosed relates to an imaging system which is used to produce color images in a single pass using a single recharging step followed by a second exposure it will be understood that it is not intended to limit the invention to such an embodiment as disclosed. On the contrary, it is intended to cover all alternatives, modifications and equivalents as may be included within the spirit and scope of the invention as defined by the appended claims. For example, an imaging system wherein recharging of the image receiver followed by image exposure immediately follows development by each color toner.

What is claimed is:

1. The method of forming color images including the steps of:
   uniformly charging a charge retentive surface to a predetermined charge level;
   forming a first plurality of tri-level images on said charge retentive surface;
   moving said first plurality of tri-level images past a development station comprising a pair of developer systems for developing said first plurality of tri-level images, each of said developer systems containing toners of different colors rendering different portions of said first plurality of tri-level images different colors;
   recharging said charge retentive surface to said predetermined level;
   forming a second plurality of tri-level images on said charge retentive surface; and
   developing said second plurality of tri-level images with developer materials having toners that are different in color from each other and from the toners used to develop said first plurality of tri-level images.

2. The method according to claim 1 wherein said step of forming a second plurality of tri-level images on said charge retentive surface comprises forming them juxtaposed each other and at least one of said first plurality of tri-level images.

* * * * *